US008289330B2

(12) United States Patent
Marshall et al.

(10) Patent No.: US 8,289,330 B2
(45) Date of Patent: *Oct. 16, 2012

(54) COLORED INVESTMENT DATA DISPLAY SYSTEM AND METHOD

(75) Inventors: James F. Marshall, Germantown, WI (US); Jonathan J. Marshall, Milwaukee, WI (US)

(73) Assignee: Spectrum Investment Advisors, Inc., Mequon, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,414

(22) Filed: Jun. 7, 2011

(65) Prior Publication Data

US 2011/0304880 A1    Dec. 15, 2011

Related U.S. Application Data

(63) Continuation of application No. 12/586,835, filed on Sep. 29, 2009, now Pat. No. 7,961,190, which is a continuation-in-part of application No. 10/388,778, filed on Mar. 14, 2003.

(51) Int. Cl.
G06T 11/20 (2006.01)
(52) U.S. Cl. ........................................ 345/440; 345/418
(58) Field of Classification Search .................. 345/418, 345/440; 705/35
See application file for complete search history.

(56) References Cited

U.S. PATENT DOCUMENTS

| 6,429,868 B1 | 8/2002 | Dehner, Jr. et al. |
| 6,510,419 B1 | 1/2003 | Gatto |
| 6,681,211 B1 | 1/2004 | Gatto |
| 6,772,146 B2 | 8/2004 | Khemlani et al. |
| 2003/0158801 A1 | 8/2003 | Chuah |
| 2003/0212621 A1 | 11/2003 | Poulter et al. |
| 2004/0019550 A1 | 1/2004 | Rajsuman et al. |
| 2004/0027349 A1 | 2/2004 | Landau et al. |
| 2004/0039675 A1 | 2/2004 | Wallman |
| 2004/0162773 A1 | 8/2004 | Del Rey et al. |
| 2006/0020531 A1* | 1/2006 | Veeneman et al. ............... 705/35 |
| 2006/0106703 A1* | 5/2006 | Del Rey et al. .................. 705/35 |
| 2006/0241949 A1 | 10/2006 | Tobias et al. |

OTHER PUBLICATIONS

Website: www.ifa.com "Index Portfolios", Index Fund Advisors, 1999, pp. 1-20.
Website: www.ifa.com "Index Portfolios", Index Fund Advisors, 1999, pp. 21-45.
Website: http://monecentral.msn.com, 2000, MSN Money.
Website: www.tsp.gov, 1995.
Website: www.allocationmaster.com, 2001, pp. 1-9, "Allocation Master: Asset Allocation Software".

* cited by examiner

Primary Examiner — Chante Harrison
(74) Attorney, Agent, or Firm — Reinhart Boerner Van Deuren s.c.

(57) ABSTRACT

A method and system that provides a unique data display tool for use in the investment area and utilizes color coated entries in various data displays to aid in the client's assimilation of investment data and information. More specifically, the method and system uses a plurality of colors that are superimposed over data contained in various data category displays. Any one category data may contain a number of different such colored overlays. It is between different data displays, the same color would be used for the same data category presented in each display.

17 Claims, 8 Drawing Sheets
(6 of 8 Drawing Sheet(s) Filed in Color)

COLORED INVESTMENT DATA DISPLAY SYSTEM AND METHOD

This patent application is a continuation of U.S. patent application Ser. No. 12/586,835, filed on Sep. 29, 2009, now U.S. Pat. No. 7,961,190, issued on Jun. 14, 2011, entitled "Colored Investment Data Display System and Method," which in turn is a continuation-in-part of U.S. patent application Ser. No. 10/388,778, filed on Mar. 14, 2003, entitled "Data Display Method and System," both of which patent applications are hereby incorporated, in full, herein by reference.

BACKGROUND OF THE INVENTION

Field of the Invention

This invention relates generally to systems and methods for acquiring, storing, processing, retrieving and displaying data on a systems configured to process, store, and display selected financial data. More specifically, it relates to a system and method for converting and displaying data in a color coded fashion whereby data may be quickly and readily assimilated by a viewer. It also relates to such a system and method whereby data can be color coded so as to be quickly and readily assimilated between various data display tools and media that may be utilized.

The need to pass along information from one person to another in a visual fashion is perhaps the most fundamental communication skill that links all of humanity. Even before verbalization was elevated to an acceptable mode of communication, visual cues formed the essence of mankind's passing of information through geographic and temporal modes. The earliest cave paintings depicted information concerning the identity of great prehistoric heroes and creatures of prey, and, ever since, mankind has sought to educate itself by using symbols, letters, and numbers to pass along similar information. The need to do so certainly has not diminished. Indeed, in today's hurried society, information is passed along at such a rate and in such volumes that it is more than can be reasonably or completely processed by the human eye and mind. Due to this deluge of information, the present inventors believe that it is clearly necessary to reverse the complexity of information that they passes on to their customers and clients and to simplify the visual communication process in the area of business in which he himself is an experienced professional.

These inventors have observed the need to facilitate the communication and assimilation process by preparing and making presentations to potential and existing clients and customers as easily understandable as possible. These inventors have also realized a need to present information in such a way that creates a continuum of order and logic between various media and modes of presentation.

In the abstract, for example, one visual display in the area of investments and asset management may be designed specifically for allowing the client or customer to view actual current information relevant to that client and to his or her investment portfolio. Another visual display may be designed for allowing the client or customer to view historical trends relevant to that client's past and future investments. Rather than creating each visual display in such a way that the client or customer is required to reorient himself or herself to the data that he or she is attempting to assimilate between such multiple displays, a far better approach is to create visual commonality between the data illustrated in the first visual display with the data illustrated in the second visual display such that the client's assimilation of the information is greatly enhanced. In this way, the client's enhanced understanding of that information is also realized.

What is needed is a method and system that displays data in the area of investments and asset management in such a way that the client or customer can view various media displays and summaries relative to his or her (or its) investment portfolio without requiring the client or customer to reorient between displays. What is also needed is such a method and system that provides an information continuum whereby the client can relatively easily navigate through the data and the data displays such that the information presented becomes easier to assimilate and understand, thereby becoming more meaningful to the client.

One advantage of such a method and system is that the client or customer is able to assimilate the information in a shorter period of time. Another advantage is that the investment professional can spend less time explaining the raw data and the data displays, thereby leaving more time for discussions with the client as to future strategies and investment decisions. The system and method of the present disclosure has obtained these advantages.

The system of the present disclosure must also be of a type which is both flexible and useable over extended periods of time, and, once established, it should also require little or no modification or redesign to be provided by the user throughout its useful lifetime. In order to enhance the market appeal of the system and method of the present disclosure, it should also be relatively inexpensive to create and operate to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided a colored display chart of investment data in one or more displays. The colored display chart includes an investment data database with the investment data listed in a plurality of categories. An investment category colored database is also included having a plurality of different colors. An investor portfolio information database is also included.

A processor is coupled to the investment database, the investment category colored database, and the investor portfolio information, with the processor configured to assign each investment data category a unique color from the investment category colored database. The processor is also configured to display such colored investment data in one of a first display and a second display on a display device coupled to the processor. Each display maintains the unique color assigned to each respective category. The display device can be one selected from a group consisting of video display device, a slide display projection, a multi-media system display, a colored printer, and a computer monitor. The colored investment data displays are associated with like data between the first and second display and the viewer can assimilate information contained within each display.

In one embodiment, the colored display chart of investment data includes realtime present value data of investment data in the investment database.

In another embodiment, the colored display chart of investment data includes a historic investment data display and a second display includes an investment result summary. The historic investment data display may also include historical investment data arranged with such investment data in a year-by-year display combined with a best-to-worst display.

There is further provided a method of conveying comparative financial investment data to a person having a personal investment. The method includes inputting personal investment data representative of the value of the personal investment into a computer readable storage unit coupled to a processor. The personal investment data includes at least a first category of investment data and a second category of investment data, with at least one category including realtime present value of a respective investment data.

The personal investment data is transferred from the storage unit to the processor and the processor converts the first category of the personal investment data into a first display representative of such personal investment data. The processor assigns a first color to the first display of the personal investment data. The processor also converts the second category of the personal investment data into the first display representative of such personal investment data (period?) and assigns a second color to the first display of the second category of the personal investment data.

The processor aligns the first and second colored categories in the first display in a predetermined arrangement on a display device coupled to the processor. The display device is selected from a group consisting of a video display device, a slide display projection, a multimedia system display, a colored printer, and a computer monitor.

In a second display, the first and second categories of the personal investment data are displayed and assigned the same colors to the first and second categories in the second display as assigned in the first display. The method displays one of the first and second displays on the display device, wherein the person can see and assimilate the personal investment data contained within one of the first and second displays.

As additionally provided a process of instructing the person of a personal investment using a processor. The process includes inputting investment data representative of the value of the personal investment into a computer readable storage unit coupled to the processor with the investment data including at least a first category of investment data and a second category of investment data. The process includes transferring the investment data from the storage unit to the processor and converting, in the processor, the first category of investment data into a first display representative of such investment data. The processor assigns a first category to the first display of the investment data, and converts, in the processor, the second category of the investment data into the first display representative of such investment data. A second color is assigned in the first display of the second category of the investment data.

The process aligns the first and second colored categories in the first display in a predetermined arrangement on a display device coupled to the processor. The display device is selected from a group consisting of a video display device, a slide display projection, a multimedia system display, a colored printer, and a computer monitor. The process also provides a second display of the first and second categories of the investment data, and assigns the same colors to the first and second categories of the second display as assigned in the first display. The process displays one of the first and second displays on the display device, wherein the person can see and assimilate the investment data contained within one of the first and second displays.

The system of the present disclosure is of a type which is both flexible and useable over extended periods of time, and which, once established, will require little or no modification or redesign to be provided by the user throughout its useful lifetime. The system and method of the present disclosure is also relatively inexpensive to create and operate to enhance its market appeal and to thereby afford it the broadest possible market. Finally, all of the aforesaid advantages and objectives are achieved without incurring any substantial relative disadvantage.

DESCRIPTION OF THE DRAWINGS

The patent or application file contains at least one drawing executed in color. Copies of this patent or patent application publication with color drawing(s) will be provided by the Office upon request and payment of the necessary fee.

The advantages of the present disclosure are best understood with reference to the drawings, in which.

DETAILED DESCRIPTION OF EXEMPLARY EMBODIMENTS

As previously mentioned, the system and method of the present invention is a unique data display tool for use in the investment area. The system and method utilize color coded entries in various data displays to aid in facilitating a client's assimilation of information. The system and method generally use a plurality of colors that are superimposed over data contained in different data displays. Any one data display may contain a number of different such color overlays. As between different data displays, however, the same colors would be used for the same data presented in each.

Figure 1:
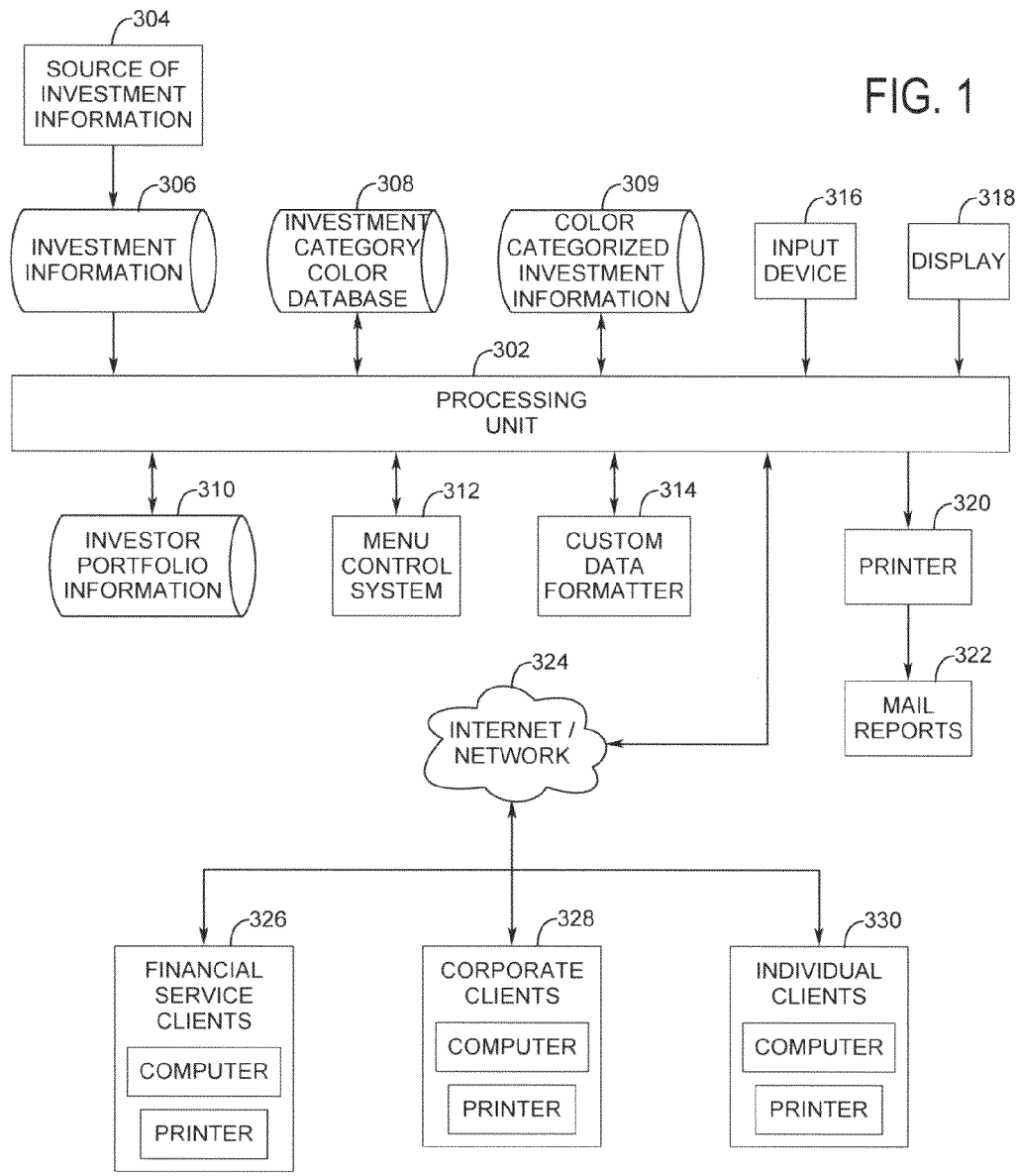
FIG. 1 is a block diagram of exemplary embodiment of a processing system for displaying investment data in colored categories in several different displays.

Referring now to the drawings in detail wherein like numbers represent like elements throughout, FIG. 1 illustrates an exemplary embodiment of a processor system 300 configured to implement the unique data display tool disclosed herein. A processing unit 302, for example, is a mainframe or a server coupled to an array of peripherals or a desktop computer or a laptop computer. Coupled to the processor are a number of data bases and lists which may themselves be coupled to additional processors.

In FIG. 1, a source of investment information 304, for example, Morningstar, Inc. which provides independent investment research, provides investment information 306 to the processor 302. Such investment information 306 can be provided by an input drive 316, coupled to the processor 302, or through an internet network 324 connection, either by hardwired or wireless devices. The investment information 306 is stored in a computer readable storage unit coupled to the processor 302 and manipulated by a menu control system 312 and custom data formatter 314 coupled to the processor 302.

Figure 3:
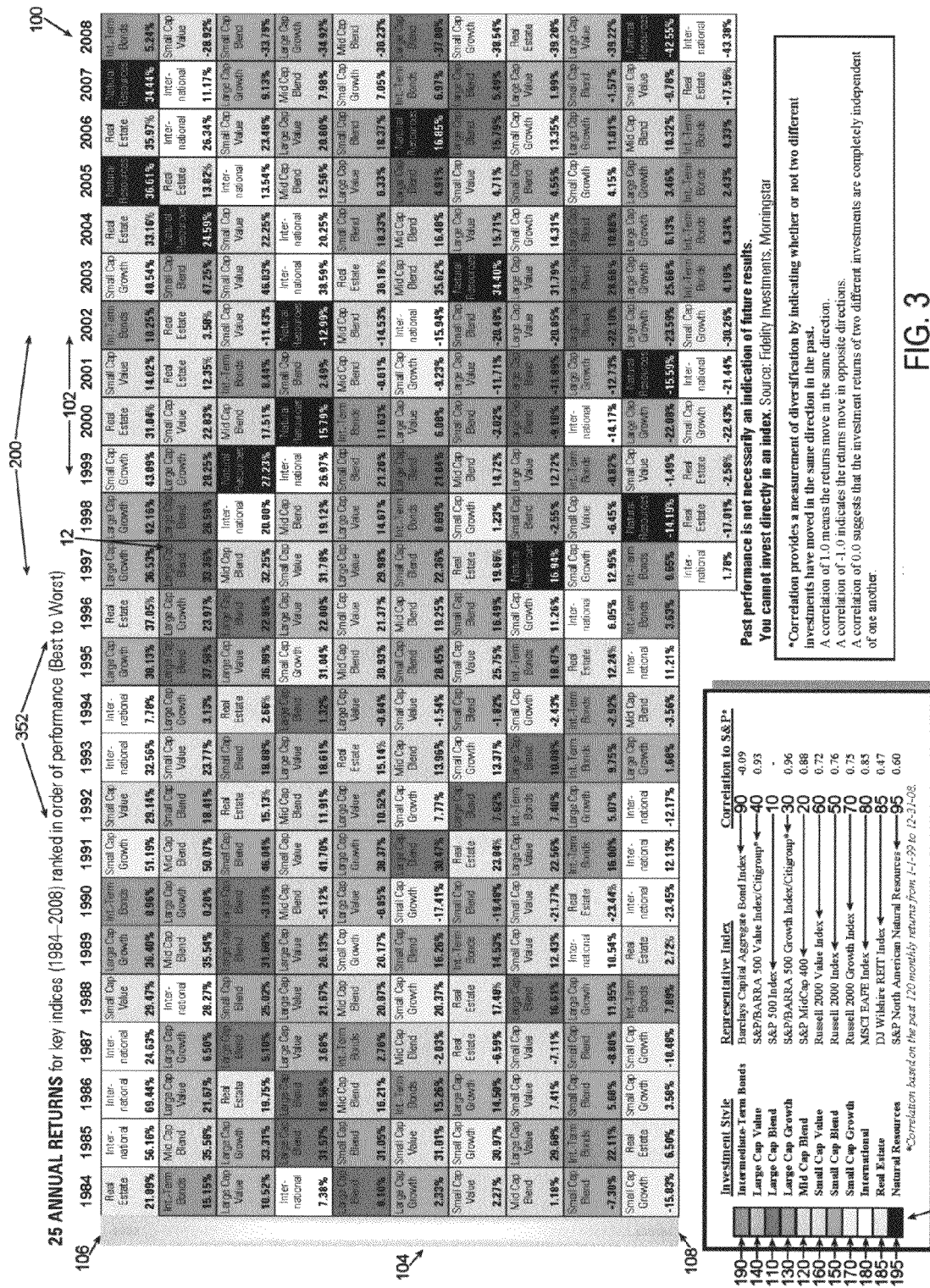
FIG. 3 is an illustration of historical investment data arranged in annual columns of colored categories from best to worst and including related information.
Figure 4:
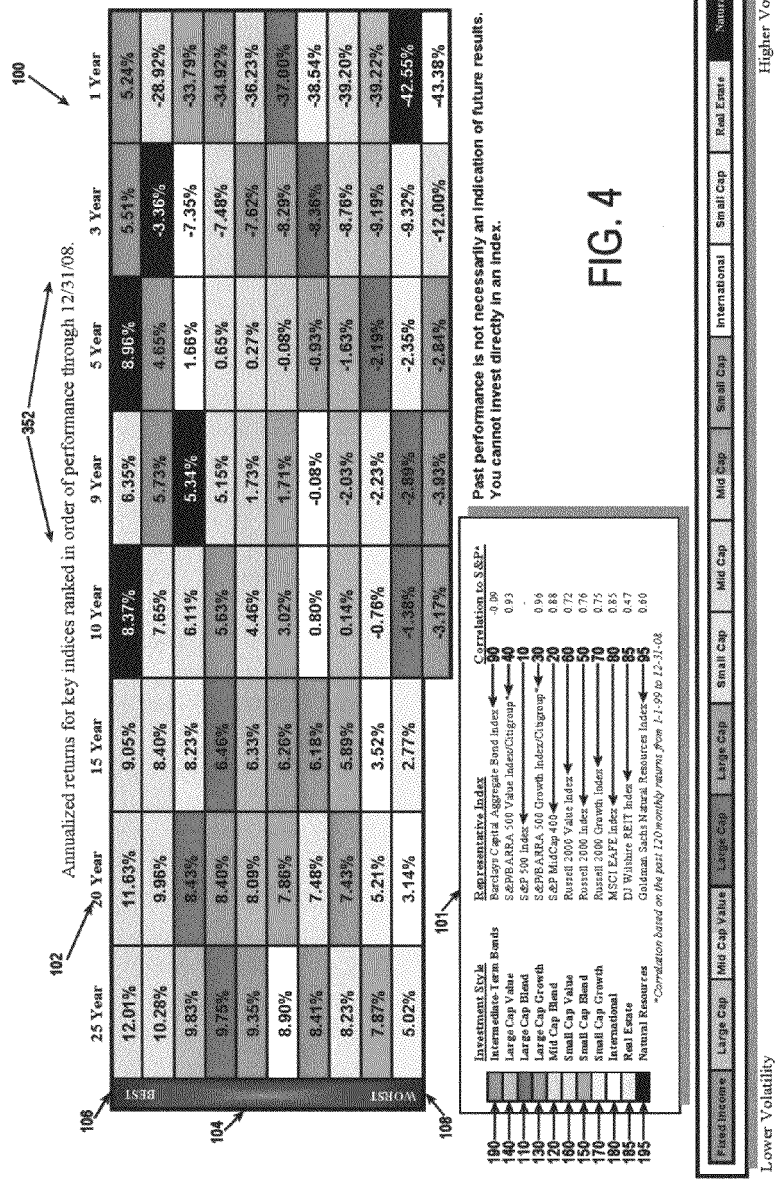
FIG. 4 is an illustration of an alternative display of historical investment data arranged in predetermined time periods of the same colored categories from best to worst as in FIG. 3 and including related information.

The processor 302 is also coupled to an investment category color database 308 configured to maintain and assign unique colors to investment categories, for example 110, 120, 130, 140, 150, 160, 170, 180, 185, 190, and 195 associated with the investment information 306. (See FIG. 3, element 101). The categories with the assigned unique color are maintained in a color categorized investment information database 309 coupled to the processor. The processor 302 maintains and aligns the several categories of investment information into historical displays, such as illustrated in FIGS. 3 and 4. The colors assigned to each investment category are maintained and used in each of the historical displays.

Also coupled to the processor 302 is investor portfolio information 310. Such information is unique to a particular investor, for example, a 401k retirement plan, an endowment plan or an individual investment plan, or similar multi-investment fund vehicles. The processor typically includes an input device 316, for example a mouse, or a keyboard, and a display device 318, for example a monitor screen or a smart phone. Such devices can be hardwired to the processor or connected wirelessly with appropriate software, firmware and hardware. The display device 316 may also include a printer 320 coupled to the processor 302. The printer 320 may be configured to mail or fax reports as determined by a user of the processor system 300. The processor system 300 is also coupled to a plurality of financial service clients 326, corporate clients 328 and individual clients 330. Such clients typically maintain their own computer and printer. The processor 302 of the processor system 300 is coupled to the clients 326, 328, and 330 through a network, for example, a local area network or wide area network, which can be one of a hardwire, network or a wireless network, for example, a Bluetooth network or an internet network, for example, by a "WIFI" connection.

Figure 2:
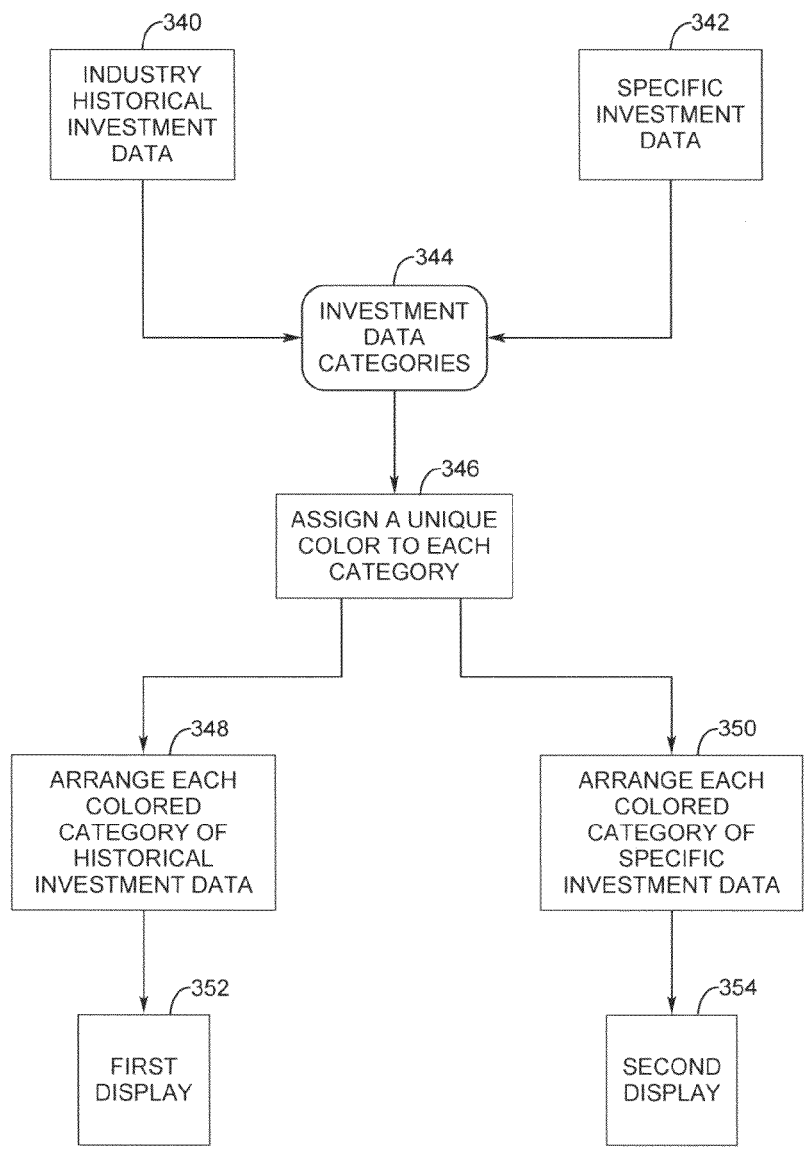
FIG. 2 is a flow diagram schematically illustrating an exemplary embodiment of a method of displaying investment data in a colored investment data display using the processing system illustrated in FIG. 1.

FIG. 2 illustrates an example of a method of displaying investment data processed in a processor in accord with the present disclosure. Industry historical investment data 310 based on the source of investment information 304 is inputted into the processor 302 and identified as a specific investment data category in the processor 302. The industry historical investment data 340 is assigned a particular investment data category 344 such as for example an intermediate term bond fund, large cap value bond fund, large cap blend fund, large cap growth fund, etc. as described more particularly below. The investment data categories 344 are assigned a unique color from the investment category color database 308, to each category 346. The color of each category is maintained throughout the processing, storage, and display and reports of the processing system 300 disclosed herein. The industry historical investment data 340 which is aligned in a specific investment data category and assigned a unique color to each category is arranged 348 in the processor 302 with the color categorized investment information 309 and displayed with the display device 318 as a first display 352.

An example of the industry historical investment data 340 in a first display 352 is illustrated in FIG. 3. FIG. 3 is typically referred to as a "periodic table" chart illustrating the several investment data categories with each unique color assigned to each category on an annual basis and is more fully described below. FIG. 3 illustrates annual investment returns for a selective investment category between the years 1984 and 2008. The table also shows the best 106 to worst 108 category in a given year along the axis 104. Additional related information can be included in the first display 352 as determined by a user of the method and system disclosed herein.

FIG. 4 illustrates an alternative first display 352 utilizing the same industry historical investment data categories and the same unique colors assigned by the processor 302 but displayed in different year segments of one year, three year, five year, nine year, ten year, fifteen year, twenty year, and twenty-five year periods. Additional related information can be included in the first display 352 as determined by a user of the method and system disclosed herein. A user of the method of displaying investment data disclosed herein can select either of the first display formats illustrated in FIGS. 3 and 4 as appropriate for a particular situation and client.

FIG. 2 also illustrates the method of displaying investment data processed in a processor 302 for specific investment data 342 such as an individual investment portfolio. The specific investment data 342 can be for an individual person maintaining an individual retirement account or a personal investment portfolio or it can be for a corporate or financial service client maintaining a 401k retirement fund or the like. The specific investment data 342 is aligned in an investment data category 344 and each category is assigned a unique color 346 and arranged in each colored category of specific investment data 350 and shown in a second display 354.

Figure 5:
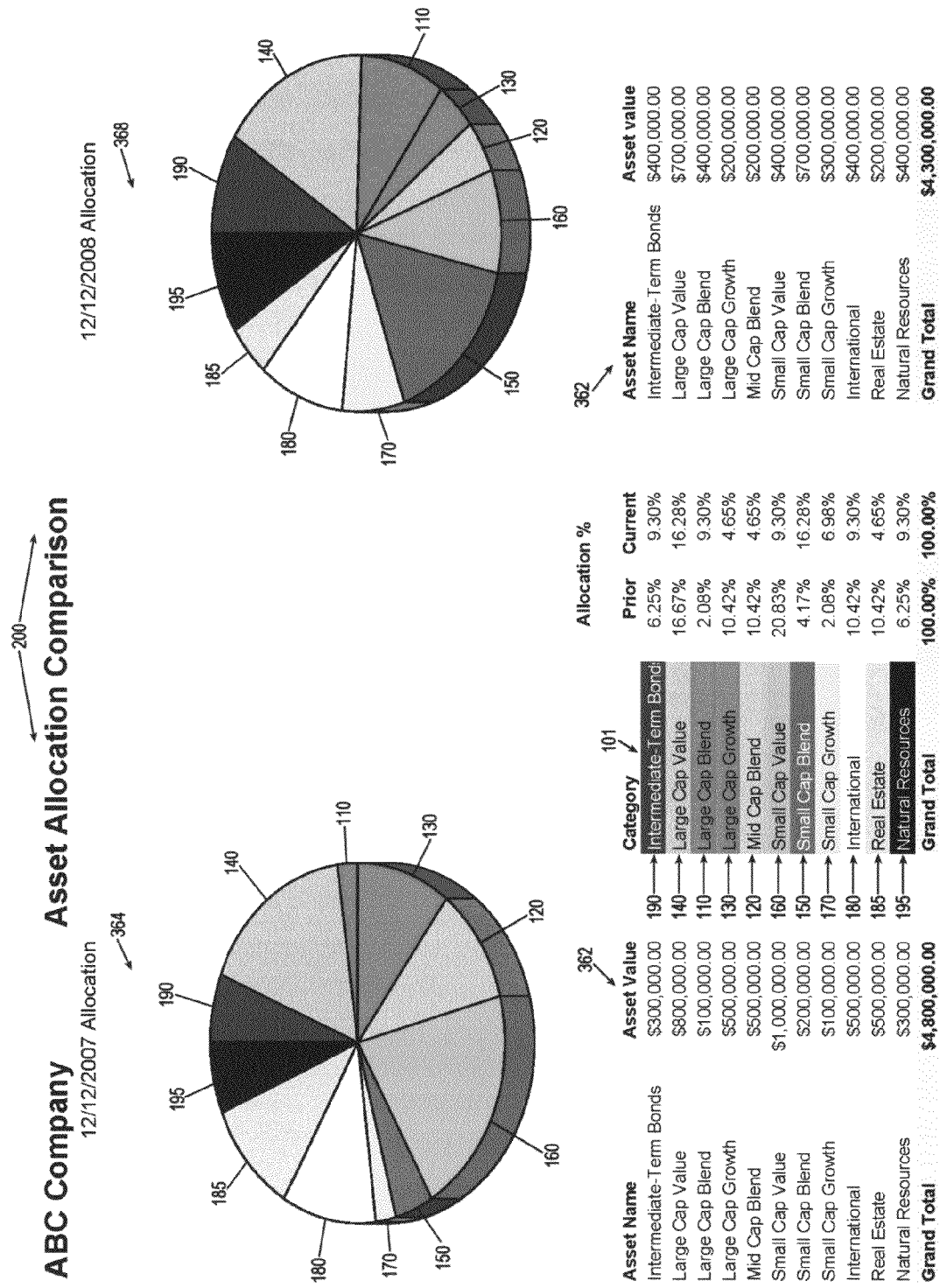
FIG. 5 is an illustration of investment data for a specific investment portfolio of a corporation comparing investment values for two time periods and displaying the investment categories in a pie chart wherein the segments are proportional to the grand total of investments and the segments are colored the same as the categories in the industry historical investment data and including related information.

FIG. 5 illustrates an example of a second display 354 for a fictitious company. The second display 354 illustrated in FIG. 5 includes a pie chart display 360 and a tabular display 362 of the various investment categories in which the fictitious company allocated its investment funds. FIG. 5 also illustrates a comparison of two specific time periods, a first time period 364 and a second time period 368. Any two time periods for which investment data is available and entered into the processor system 300 can be compared as illustrated in FIG. 5. The left side of FIG. 5 illustrates a time period 364 ending Dec. 12, 2007 and the right side of FIG. 5 illustrates the investments at a time period 368 ending Dec. 12, 2008. Each of the pie charts illustrated are colored with the same colors assigned to the specific investment data categories as described in the historical industry investment data 340. Further, each of the pie segments are in proportion to the grand total of investment assets. As can be seen in viewing FIG. 5, the company can easily see the change of investment values between the two time periods by simply comparing the size of each individual segment which has the same category color. A tabular display 362 for each time period 364, 368 of investment values is also provided.

Figure 6:
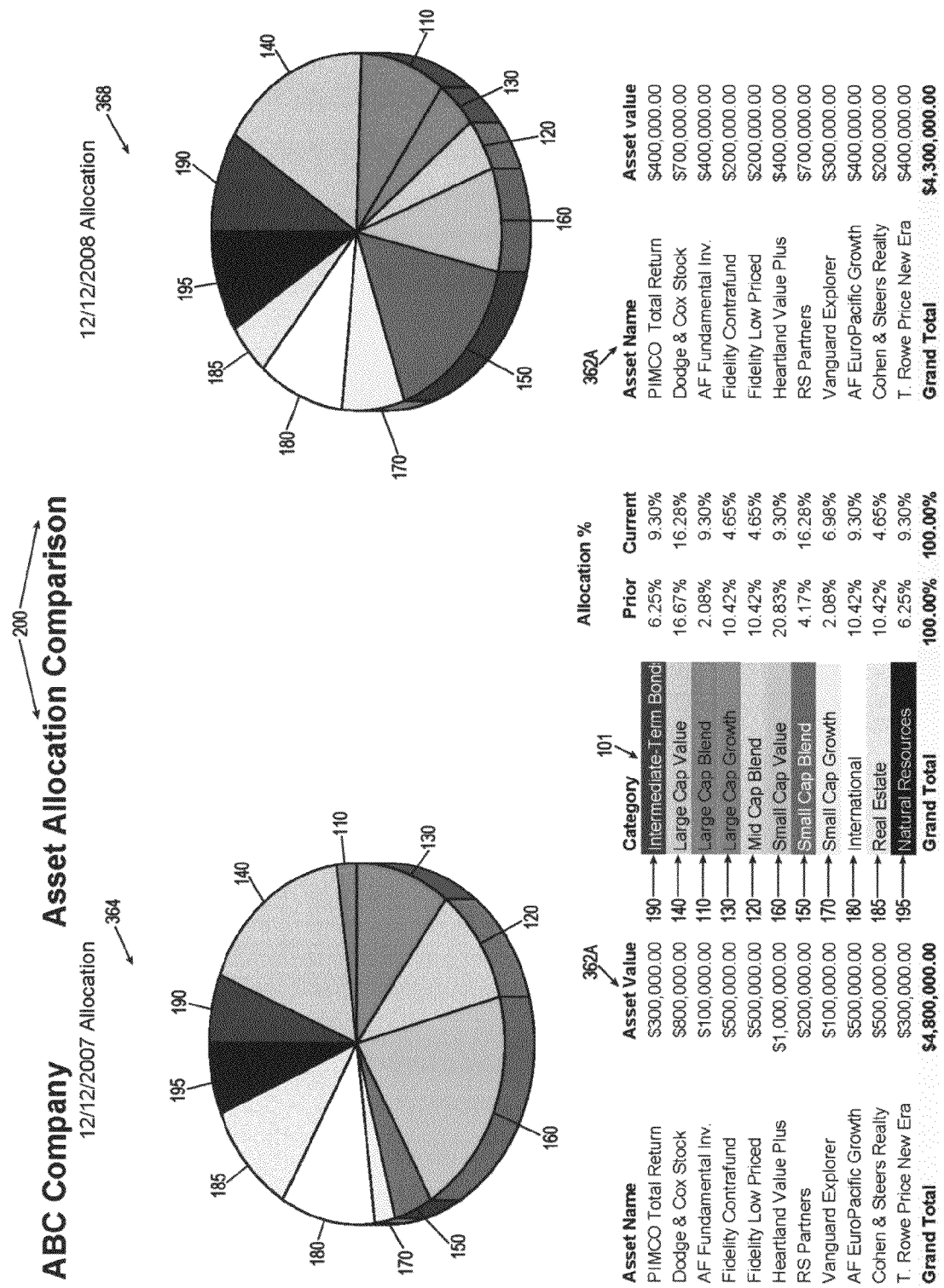
FIG. 6 is an exemplary embodiment of the second display illustrated in FIG. 5 but with specific mutual funds representative of the colored categories listed in the tabular display and the historical industry investment data.

FIG. 6 is an example of the second display 354 described in FIG. 5 but with specific mutual funds representative of the categories listed in tabular display 362A. Consistent with the method and system disclosed herein, the same color is assigned to specific investment data categories as described in the historical industry investment data is maintained.

FIG. 3 illustrates a first display 352 in a two-dimensional fictitious data display, generally identified 100, showing historical investment portfolio data. More specifically, the historical investment data display 100 includes a tabular display of data by years 102 and performance ranking 104. The years 102 displayed range from 1982 to 2001, inclusive, along the horizontal. The performance ranking 104 ranges from best performers 106 at the top of the display 100 to worst performers 108 at the bottom. Various investment categories are identified in a unique color legend 101 located at the left bottom portion of the display 100. Each investment category is assigned a color that is used uniformly throughout this first data display 100. It should be understood, however, that the types of categories identified in this preferred embodiment are for illustration purposes only. The number and types of categories could be varied without deviating from the scope of the present invention. Additionally, some of the categories could be deleted and other categories could be included without departing from the scope of the present disclosure.

For example, the S&P 500® Index notation 10 is included in the category legend 101 and is identified as a green color 110 within the legend 101 as well as at various points within the display 100 ("S&P 500" is a registered service mark of McGraw-Hill Companies, Inc.). In this particular display 100, the S&P 500® Index notation 10 identifies the performance of large capitalization United States stocks. The S&P 500® Index 10 is an unmanaged market value-weighted index of five hundred stocks that are publicly traded. The weightings make each company's influence on the index performance directly proportional to that company's market value.

Similar notations are included within the category legend 101 for other categories, for example, the S&P MidCap 400 index 20, the S&P/BARRA 500 Growth index 30, the S&P/BARRA 500 Value index 40, the Russell 2000® Index 50, the Russell 2000® Value index 60, the Russell 2000® Growth index 70, the MSCI EAFE® index 80, and the LB Agg index 90 ("Russell 2000" is a registered service mark of Frank Russell Company and "EAFE" is a registered service mark of Morgan Stanley, Dean Witter, Discover & Co.) Each such index 10, 20, 30, 40, 50, 60, 70, 80, 90 is included in each year 102 of the display for purposes of illustrating how that particular index performed in any given year. The ranking 104, from the best 106 to the worst 108 is an indicator of overall performance for that year. For example, in the years 1995 through 1998, the S&P 500® Index 10 is shown 12 to be one of the top investment performers. In the years 2000 and 2004, it is shown to be one of the worst. The trends in this performance are readily identifiable with the green color 110 associated with that corresponding index 10. It is also to be understood that other colors could be assigned to each such index without deviating from the scope of the present invention. The particular colors identified in this specification are, however, believed by this inventor to further maximize the quick assimilation and understanding of presented investment data.

Referring again to the category legend 101 in FIG. 3, the S&P MidCap 400 index 20 is an unmanaged market capitalization-weighted index of four hundred medium-capitalization stocks. In the category legend 101, this index 20 is illustrated as having a pale blue color 120 associated with it. The S&P MidCap 400 index is shown as being a fairly consistent and good investment as shown by its performance ranking in the years 1985, 1989 and 1991, respectively.

Similarly, notations for the S&P/BARRA 500 Growth index 30 and the S&P/BARRA 500 Value index 40 are also given in the category legend 101 of the historical display 100. These indices 30, 40 measure the performance of the growth and values styles of investing in large-capitalization United States stocks, respectively. These indices 30, 40 are unmanaged and constructed by dividing the stocks in the S&P 500® Index 10 according to price-to-book ratios. The Growth index 30 contains stocks with higher price-to-book ratios. The Value index 40 contains stocks with lower price-to-book ratios. The indices 30, 40 are market capitalization-weighted and their constituents are mutually exclusive. The Growth index 30 is readily identified by a red color 130. The Value index 40 is identified by a violet purple color 140.

The category legend 101 also includes a brown color 150 for denoting the Russell 2000® Index 50. This Index 50 measures the performance of small-capitalization United States stocks. The legend 101 includes a light orange color 160 for denoting the Russell 2000® Value index 60 and a yellow color 170 for the Russell 2000® Growth index 70. These indices 50, 60 measure the performance of growth and value styles of investing in small-capitalization United States stocks.

The category legend 101 includes white 180 which identifies the MSCI EAFE® index 80, an unmanaged international index that is designed to measure the performance of the developed stock markets of Europe, Australia, Asia and the Far East. The LB Agg index 90 is a Lehman Brothers Aggregate Bond index that is also unmanaged and includes United States government, corporate, and mortgage-backed securities with maturities up to thirty years. This index 90 is identified by a blue color 190.

The category legend 101 also includes the color gray 185 denoting the DJ Wilshire REIT index 85 investing in real estate. The category legend 101 further includes black 195 denoting the S&P North American Natural Resources 95 investing in natural resources.

It should be understood that any index may be changed from time to time and substituted with a different index in the same category. It should also be understood that additional categories may be added and assigned a unique color for such category. Selected categories may also be eliminated from time to time without departing from the present disclosure.

FIG. 4 is an alternative display 100 of the historical investment portfolio data illustrated in FIG. 3. The unique color assigned to each investment category is the same in each display. In FIG. 4 annualized return in each category are grouped in different time periods than the yearly time periods illustrated in FIG. 3. In FIG. 4, the year 102 displayed are grouped as 1, 3, 5, 9, 10, 15, 20, and 25 year spans, ending as of Dec. 31, 2008. It should be understood that any grouping of years may be selected as determined by a user of the method and system disclosed herein.

Referring now to FIG. 5, an exemplary embodiment of an investment result summary, generally identified 200, for a particular (in this case a corporation), though fictitious, client is illustrated in an example of a second display 354. In it, certain categories of funds 101, made up of particular funds that would be included in the indices referred to above, are included. More importantly, those particular funds are color coded in accordance with the color scheme previously described as being used with the historical data display 100 of FIGS. 3 and 4. For example, the category large cap blend, shown in FIGS. 3 and 4, is listed in the investment result display 200 with a green color 110 background. A specific fund used in this example can be the S&P 500 index 10; however, any large cap blend fund or combination of large cap blend funds can be used. This background corresponds to the same green color 110 that is used in the historical display 100 that is illustrated in both FIGS. 3 and 4. In this fashion, the client, or any other viewer of this investment information for that matter, can quickly associate that fund category 110 as being of the type that would be included in the S&P 500® Index 10 that is illustrated in the historical display 100 of FIGS. 3 and 4, and vice versa. For the same reason, and to the same end, other entries in the investments results display 200 are similarly color coded such that the pale color 120, the red color 130, the violet purple color 140, the brown color 150, the light orange color 160, the yellow color 170, the white 180, gray 185, the blue color 190, and the black 195 are each associated with the corresponding indices 20, 30, 40, 50, 60, 70, 80, 85, 90, and 95, respectively, as illustrated in the historical display 100 as shown in FIGS. 3 and 4.

FIG. 6 is an example of the second display 354 described in FIG. 5 but with specific mutual funds representative of the categories listed in tabular display 362A. Consistent with the method and system disclosed herein, the same color is assigned to specific investment data categories as described in the historical industry investment data is maintained.

Figure 7:
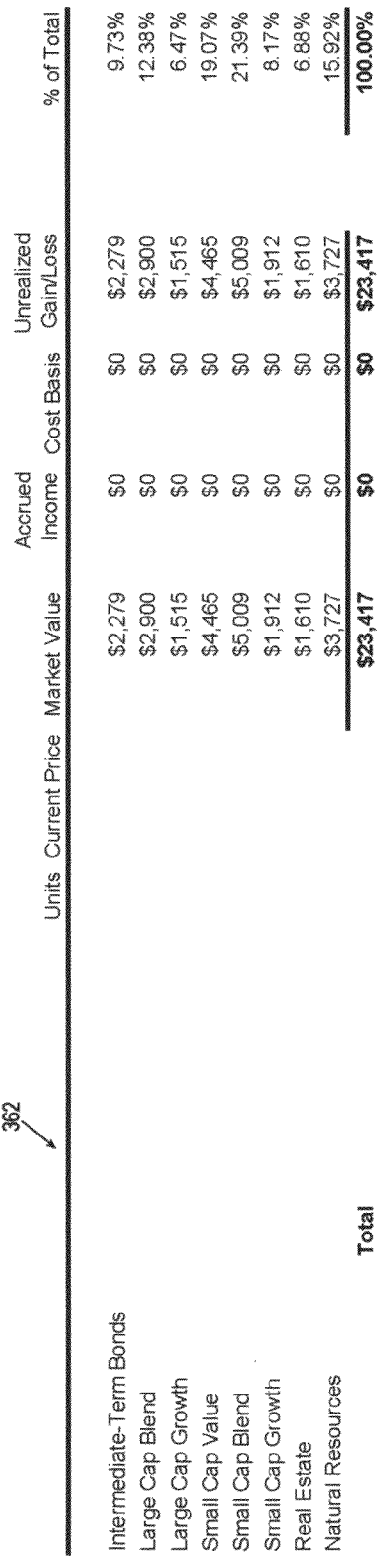
FIG. 7 is an illustration of investment data for a specific investment portfolio of an individual and displaying the investment categories in a pie chart wherein the segments are proportional to the grant total of investments and the segments are colored the same as the categories in the industry historical investment data and including related information.

Referring now to FIG. 7 is an exemplary embodiment of an investment result summary, generally identified 400, for a particular fictitious individual, generated by the method and system disclosed herein in an example of a second display 354. In it, certain categories of funds, made up of particular funds that would be included in the indices referred to above, are included. More importantly, those particular funds are color coded in accordance with the color scheme previously described as being used with the historical data display 100 of FIGS. 3 and 4. For example, the category large cap blend, shown in FIGS. 3 and 4, is listed in the investment result display 400 with a green color 110 background. A specific fund used in this example can be the S&P 500 index 10; however, any large cap blend fund or combination of large cap blend funds can be used. This background corresponds to the same green color 110 that is used in the historical display 100 that is illustrated in both FIGS. 3 and 4. In this fashion, the client, or any other viewer of this investment information for that matter, can quickly associate that fund category 110 as being of the type that would be included in the S&P 500® Index 10 that is illustrated in the historical display 100 of FIGS. 3 and 4, and vice versa. For the same reason, and to the same end, other entries in the investments results display 400 are similarly color coded such that the red color 130, the brown color 150, the light orange color 160, the yellow color 170, the white 180, gray 185, the blue color 190, and the black 195 are each associated with the corresponding indices 30, 50, 60, 70, 80, 85, 90, and 95, respectively, as illustrated in the historical display 100 as shown in FIGS. 3 and 4.

Figure 8:
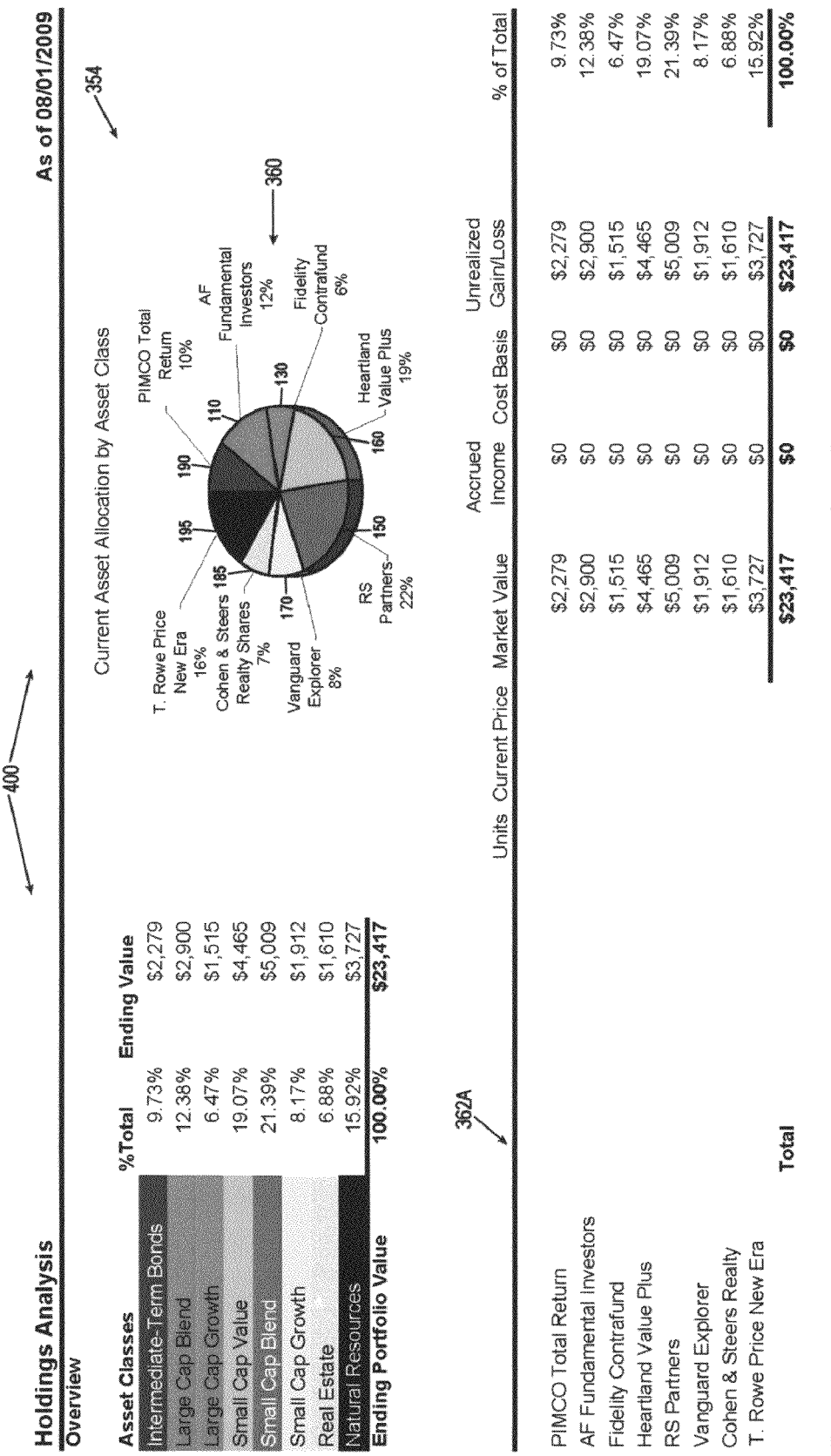
FIG. 8 is an exemplary embodiment of the second display illustrated in FIG. 7 but with specific mutual funds representative of the colored categories listed in the tabular display and the historical industry investment data.

FIG. 8 is an example of the second display 354 described in FIG. 7 with specific mutual funds representative of the categories listed in tabular display 362A. Consistent with the method and system disclosed herein, the same color is assigned to specific investment data categories as described in the historical industry investment data is maintained.

It is also to be understood that the method and system of the present disclosure is not limited to providing only the preferred historical display 100 and the specific investment results displays 200 and 400 as disclosed herein. The present method and system could also include any number of like displays including multimedia displays such as slide presentations, video displays, or other like technologies containing like investment information. The method and system of the present invention could be utilized to provide the same color coding to investment brochures and promotional literature of the company or entity that provides such investment data to its clients and customers.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the system and method has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the disclosure as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the system and method in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A system for a color display chart of investment data in one or more displays comprising:
    an investment data database with the investment data listed in a plurality of categories, the investment data being historic investment data for a corresponding plurality of years;
    an investment category color database including a plurality of different colors;
    an investor portfolio information database; and
    a processor coupled to the investment data database, the investment category color database, and the investor portfolio information, with the processor configured to assign each investment data category a unique color from the investment category color database and display such colored investment data in one of a first display and a second display on a display device coupled to the processor and with each display maintaining the unique color assigned to each respective category, the processor further configured to convert the investor portfolio information database into a pie chart configured with a segment for each category of investment data in the investor investment portfolio and the processor configured to convert the historic investment data into a tabular chart, with each of the pie chart and tabular chart maintaining the same color for the same investment category, wherein the display device is selected from a group consisting of a video display device, a slide display projection, a multimedia system display, a color printer, and a computer monitor; and
    wherein such colored investment data displays associate like data between the first and second display and viewer can assimilate information contained within each display.

2. The system for a color display chart of investment data of claim 1, including real time present value data of investment data in the investment data database.

3. The system for a color display chart of investment data of claim 1, wherein each segment of the pie chart is configured in proportion to the value of the corresponding category of investment data.

4. The system for a color display chart of investment data of claim 1, wherein the second display is a pair of pie charts with each pie chart configured with a segment for each category of investment data, and with one pie chart representative of a first time period and the other pie chart representative of a second time period.

5. The system for a color display chart of investment data of claim 1, wherein one of the colors of green, pale blue, red, violet purple, brown, light orange, yellow, white, blue, gray, and black is uniquely assigned to one of the investment data categories used with the displays, and wherein the colors are consistently used with each display.

6. The system for a color display chart of investment data of claim 5, wherein two of the colors are used in one category to represent a balanced fund.

7. The system for a color display chart of investment data of claim 1, wherein the historical investment data display includes historical investment data arranged with such investment data in a year-by-year display combined with a best-to-worst display.

8. The system for a color display chart of investment data of claim 1, further comprising a print of the displayed display from a printer device.

9. A process of instructing a person of a personal investment using a processor, the process comprising:
- inputting investment data representative of the value of the personal investment into a computer readable storage unit coupled to the processor with the investment data including at least a first category of investment data and a second category of investment data;
- transferring the investment data from the storage unit to the processor;
- converting in the processor the first category of the investment data into a first display representative of such investment data;
- assigning a first color in the first display of the investment data;
- converting in the processor the second category of the investment data into the first display representative of such investment data;
- assigning a second color in the first display of the second category of the investment data;
- aligning the first and second colored categories in the first display in a predetermined tabular chart arrangement on a display device coupled to the processor, wherein the display device is selected from a group consisting of a video display device, a slide display projection, a multimedia system display, a color printer, and a computer monitor;
- providing a second display of the first and second categories of the investment data;
- assigning the same colors to the first and second categories in the second display as assigned in the first display; wherein the second display is a pie chart configured with a segment for each category of investment data; and
- displaying one of the first and second displays on the display device, wherein the person can see and assimilate the investment data contained within one of the first and second display, with each of the pie chart and tabular chart displayed with the same color for the same investment category.

10. The process of instructing of claim 9, wherein the step of inputting investment data includes the step of obtaining real time present value of the investment data.

11. The process of instructing of claim 9, wherein each segment of the pie chart is configured in proportion to the value of the corresponding category of investment data.

12. The process of instructing of claim 9, wherein the second display is a pair of pie charts with each pie chart configured with a segment for each category of investment data, and with one pie chart representative of a first time period and the other pie chart representative of a second time period.

13. The process of instructing of claim 9, wherein one of the colors of green, pale blue, red, violet purple, brown, light orange, yellow, white, blue, gray, and black is uniquely assigned to one of the investment data categories used with the displays, and wherein the colors are consistently used with each display.

14. The process of instructing of claim 13, wherein two of the colors are used in one category to represent a balanced fund.

15. The process of instructing of claim 9, wherein the step of aligning includes providing a historical investment data display and the step of providing a second display includes providing an investment result summary.

16. The process of instructing of claim 15, wherein the historical investment data display step includes providing historical investment data and arranging such investment data in a year-by-year display combined with a best-to-worst display.

17. The process of instructing of claim 9, wherein the step of displaying includes the step of printing the displayed display on a printer device.

* * * * *